US008218614B2

(12) United States Patent
Chen et al.

(10) Patent No.: US 8,218,614 B2
(45) Date of Patent: Jul. 10, 2012

(54) ELECTRONIC EQUALIZATION AND ELECTRONIC DEPOLARIZATION METHOD, RECEIVING END EQUIPMENT, AND COMMUNICATION SYSTEM

(75) Inventors: Zihuan Chen, Chengdu (CN); Lei Liu, Chengdu (CN); Changsong Xie, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/248,555

(22) Filed: Sep. 29, 2011

(65) Prior Publication Data

US 2012/0020405 A1    Jan. 26, 2012

Related U.S. Application Data

(63) Continuation of application No. PCT/CN2010/070129, filed on Jan. 12, 2010.

(30) Foreign Application Priority Data

Mar. 30, 2009   (CN) .......................... 2009 1 0132346

(51) Int. Cl.
*H04L 27/01* (2006.01)
(52) U.S. Cl. ........ 375/232; 375/260; 375/316; 375/229; 375/230; 375/231; 375/259
(58) Field of Classification Search .................. 375/260, 375/316, 232, 229, 230, 231, 259
See application file for complete search history.

(56) References Cited

U.S. PATENT DOCUMENTS

| 7,894,728 | B1 * | 2/2011 | Sun et al. ...................... 398/208 |
| 2002/0051487 | A1 | 5/2002 | Yamada et al. | |
| 2005/0196176 | A1 | 9/2005 | Sun | |
| 2005/0226350 | A1 * | 10/2005 | Goto ............................. 375/317 |
| 2007/0092259 | A1 | 4/2007 | Bontu | |
| 2007/0211835 | A1 | 9/2007 | Inagawa et al. | |

(Continued)

FOREIGN PATENT DOCUMENTS

CN    1351454 A    5/2002

(Continued)

OTHER PUBLICATIONS

Written Opinion of the International Searching Authority (translation) dated (mailed) Apr. 22, 2010, issued in related Application No. PCT/CN2010/070129, filed Jan. 12, 2010, Huawei Technologies Co., Ltd.

(Continued)

*Primary Examiner* — Siu Lee
(74) *Attorney, Agent, or Firm* — Finnegan, Henderson, Farabow, Garrett & Dunner LLP

(57) ABSTRACT

Embodiments of the present invention disclose an electronic equalization and electronic depolarization method, a receiving end equipment, and a communication system. According to the embodiments of the present invention, parameters required by electronic equalization and electronic depolarization are calculated by detecting a Synchronization Sequence (SS) in a received signal, and then the electronic equalization and the electronic depolarization are performed on the received signal in a frequency domain by utilizing the parameters, so as to solve a problem of the electronic equalization and the electronic depolarization in a Polarization Division Multiplexing (PDM) Orthogonal Frequency Division Multiplexing (OFDM) system. Furthermore, the realization complexity of the electronic equalization and the electronic depolarization performed in the frequency domain is greatly reduced relative to the electronic equalization and the electronic depolarization performed in a time domain.

8 Claims, 6 Drawing Sheets

U.S. PATENT DOCUMENTS

| | | | |
|---|---|---|---|
| 2009/0148164 A1* | 6/2009 | Roberts et al. | 398/65 |
| 2009/0256622 A1* | 10/2009 | Roberts | 327/512 |
| 2010/0119241 A1* | 5/2010 | Yang et al. | 398/208 |
| 2011/0083056 A1* | 4/2011 | Choi et al. | 714/756 |

FOREIGN PATENT DOCUMENTS

| | | |
|---|---|---|
| CN | 1574820 A | 2/2005 |
| WO | WO 2005/112320 A2 | 11/2005 |
| WO | WO2009035514 A1 | 3/2009 |
| WO | WO2010111897 | 10/2010 |

OTHER PUBLICATIONS

International Search Report for International Application No. PCT/CN2010070129, mailed Apr. 22, 2010 Huawei Technologies C., Ltd.

Supplementary European Search Report dated (mailed) Mar. 19, 2012, issued in related Application No. 10758000.3-2415 / 2408159, PCT/CN2010070129, Hauwei Technologies Co., Ltd.

Schmidl et al., "Robust Frequency and Timing Synchronization for OFDM", IEEE Transactions on Communications, vol. 45, No. 12, Dec. 1997.

Jansen et al., "Long-haul transmission of 16x52.5 Gbits/s polarization-divisionmultiplexed OFDM enabled by MIMO processing (Invited)", Journal of Optical Networking, vol. 7, No. 2, Feb. 2002.

Winzer et al., "112-Gb/s Polarization-Multiplexed 16-QAM on a 25-GHz Wdm Grid" Bell Labs, Alcatel-Lucent, 791 Holmdel-Keyport Road, Holmdel, NJ 07733, USA, Th.3.E.5, Sep. 2008, Brussels, Belgium.

Laperle et al., WDM Performance and PMD Tolerance of a Coherent 40-Gbit/s Dual-Polarization QPSK Transceiver, Journal of Lightwave Technology, vol. 26, No. 1, Jan. 1, 2008.

Gnauck et al., "10 x 112-Gb/s PDM 16-QAM Transmission Over 630 km of Fiber with 6.2-b/s/Hz Spectral Efficiency". PDPB8.pdf, Alcatel-Lucent, Bell Labs, Holmdel, NJ 07733, USA, 978-1-55752-869-8, Aug. 2009.

* cited by examiner

ELECTRONIC EQUALIZATION AND ELECTRONIC DEPOLARIZATION METHOD, RECEIVING END EQUIPMENT, AND COMMUNICATION SYSTEM

CROSS-REFERENCE TO RELATED APPLICATIONS

This application is a continuation of International Application No. PCT/CN2010/070129, filed on Jan. 12, 2010, which claims priority to Chinese Patent Application No. 200910132346.6, filed on Mar. 30, 2009, both of which are hereby incorporated by reference in their entireties.

FIELD OF THE INVENTION

The present invention relates to the field of communication technologies, and in particular, to an electronic equalization and electronic depolarization method, a receiving end equipment, and a communication system.

BACKGROUND OF THE INVENTION

The Orthogonal Frequency Division Multiplexing (OFDM) is a high speed transmission technology, and a basic principle of the technology is to transform high speed serial data into multiple paths of relatively low speed parallel data and modulate different carriers. The parallel transmission system greatly extends a pulse width of a symbol, and improves a performance of anti-multipath fading. The Polarization Division Multiplexing (PDM) technology may reduce a baud rate of the system by a half, relaxes a bandwidth requirement on high speed electronic devices, allows smooth upgrade from an existing 10 Gb/s commercial optical transmission network, and is a technology of great potential. The OFDM in combination with the PDM technology is a high speed optical transmission development trend worth being focused on in the future.

In a PDM OFDM system, the OFDM technology is adopted; a signal period becomes longer; and a Cyclic Prefix (CP) is introduced. Therefore, the influence of the inter-symbol interference brought by the dispersion may be constrained, but meanwhile, a channel also brings distortion to a signal. For example, a sent signal of a $k^{th}$ sub-channel is $S_t^k = A_t^k \cdot j^{\phi_t^k}$, in which $A_t^k$ is an amplitude of the signal, and $\phi_t^k$ is a phase of the signal. A frequency domain response of the channel in the sub-channel is $H_k = A_H^k \cdot e^{j \cdot \phi_H^k}$, in which $A_H^k$ is an amplitude-frequency response of the channel, and $\phi_H^k$ is a phase-frequency response of the channel. Then, a received signal is: $S_r^k = H_k \cdot S_t^k = A_H^k \cdot A_t^k \cdot e^{j \cdot (\phi_H^k + \phi_t^k)}$, and it can be known that, an amplitude of the received signal is $A_r^k = A_H^k \cdot A_t^k$, and a phase thereof is $\phi_r^k = \phi_H^k + \phi_t^k$. It can be known that, both the amplitude and the phase of the received signal are influenced by the channel, and signal distortion is caused, so electronic equalization processing needs to be performed on the channel, so as to eliminate the influence on the signal brought by the channel.

In another aspect, when a light beam is transmitted in an optical fiber, random birefringence occurs, so two polarization states such as an X polarization state and a Y polarization state of the sent signal in the transmission procedure continuously rotate. However, at a receiving end, channel characteristics are unknown, and two polarization states such as an X' polarization state and a Y' polarization state of the received signal do not track rotation of the X polarization state and the Y polarization state in real time, so a cross-talk occurs between two paths of received signals. A mathematical model of transmission in the channel is represented with a matrix as follows:

$$\begin{bmatrix} X_r^k \\ Y_r^k \end{bmatrix} = \begin{bmatrix} H_{xx}^k & H_{xy}^k \\ H_{yx}^k & H_{yy}^k \end{bmatrix} \begin{bmatrix} X_t^k \\ Y_t^k \end{bmatrix}$$

$X_r^k = H_{xx}^k \cdot X_t^k + H_{xy}^k \cdot Y_t^k$ and $Y_r^k = H_{yx}^k \cdot X_t^k + H_{yy}^k \cdot Y_t^k$ are obtained.

$[\bullet]^k$ represents the $k^{th}$ sub-channel; $X_t^k$ is the sent signal in the X polarization state; $X_r^k$ is the received signal in the X' polarization state; $Y_t^k$ is the sent signal in the Y polarization state; $Y_r^k$ is the received signal in the Y' polarization state; $H_{xx}^k$ represents a direct channel of the sent signal in the X polarization state; $H_{xy}^k$ represents a cross-talk channel of the sent signal in the Y polarization state for the sent signal in the X polarization state; $H_{yx}^k$ represents a cross-talk channel of the sent signal in the X polarization state for the sent signal in the Y polarization state; and $H_{yy}^k$ represents a direct channel of the sent signal in the Y polarization state. It can be known from the formula that, $X_r^k$ and $Y_r^k$ respectively include different components of the X polarization state and the Y polarization state, and the cross-talk brings extremely serious damages to the system performance, so electronic depolarization processing needs to be performed on the two received signals.

The prior art does not have a relevant solution for the problem that the electronic equalization and the electronic depolarization are required to be performed on the PDM OFDM system. An existing electronic depolarization solution is mainly for a single-carrier system, and the electronic depolarization in the prior art is performed in a time domain, that is, the electronic depolarization is directly performed on a time domain signal, so the complexity of the computation and the hardware is relatively high.

SUMMARY OF THE INVENTION

Embodiments of the present invention provide an electronic equalization and electronic depolarization method, a device, and a communication system, so as to solve a problem of electronic equalization and electronic depolarization in a PDM OFDM system simply.

An electronic equalization and electronic depolarization method, includes:

converting a received time domain signal into a frequency domain signal;

detecting a Synchronization Sequence (SS) (or referred to as a Synchronization Symbol (Sync Symbol)) in the received time domain signal, and obtaining a corresponding control signal;

calculating parameters required by electronic equalization and electronic depolarization according to the control signal; and performing the electronic equalization and the electronic depolarization on the frequency domain signal by utilizing the parameters.

A receiving end equipment, includes:

a conversion unit, configured to convert a received time domain signal into a frequency domain signal;

a detection unit, configured to detect an SS in the received time domain signal, and obtain a corresponding control signal;

a parameter calculation unit, configured to calculate parameters required by electronic equalization and electronic depolarization according to the control signal obtained by the detection unit; and a processing unit, configured to perform the electronic equalization and the electronic depolarization on the frequency domain signal converted by the conversion unit by utilizing the parameters calculated by the parameter calculation unit.

A communication system includes a sending end equipment and a receiving end equipment.

The sending end equipment is configured to send a time domain signal to the receiving end equipment.

The receiving end equipment is configured to receive the time domain signal sent by the sending end equipment, convert the received time domain signal into a frequency domain signal, detect an SS in the received time domain signal, obtain a corresponding control signal, calculate parameters required by electronic equalization and electronic depolarization according to the control signal, and perform the electronic equalization and the electronic depolarization on the converted frequency domain signal by utilizing the parameters.

According to the embodiments of the present invention, parameters required by electronic equalization and electronic depolarization are calculated by detecting an SS in a received signal, and then the electronic equalization and the electronic depolarization are performed on the received signal in a frequency domain by utilizing the parameters, so as to solve a problem of the electronic equalization and the electronic depolarization in a PDM OFDM system. Furthermore, the realization complexity of the electronic equalization and the electronic depolarization performed in the frequency domain is greatly reduced relative to the electronic equalization and the electronic depolarization performed in a time domain.

BRIEF DESCRIPTION OF THE DRAWINGS

To make technical solutions in the embodiments of the present invention clearer, the following briefly introduces the accompanying drawings required for describing the embodiments. Evidently, the accompanying drawings to be described merely show some embodiments of the present invention, and those of ordinary skill in the art may derive other drawings from such accompanying drawings without any creative effort.

DETAILED DESCRIPTION OF THE EMBODIMENTS

The following describes technical solutions in embodiments of the present invention clearly and completely with reference to accompanying drawings. Evidently, the embodiments to be described are only a part of, rather than all of the embodiments of the present invention. All other embodiments obtained by those of ordinarily skill in the art based on the embodiments of the present invention without creative effects fall within the protection scope of the present invention.

The embodiments of the present invention provide an electronic equalization and electronic depolarization method, and a corresponding receiving end equipment and a corresponding communication system, which are respectively illustrated in detail in the following.

Embodiment 1

Figure 1:
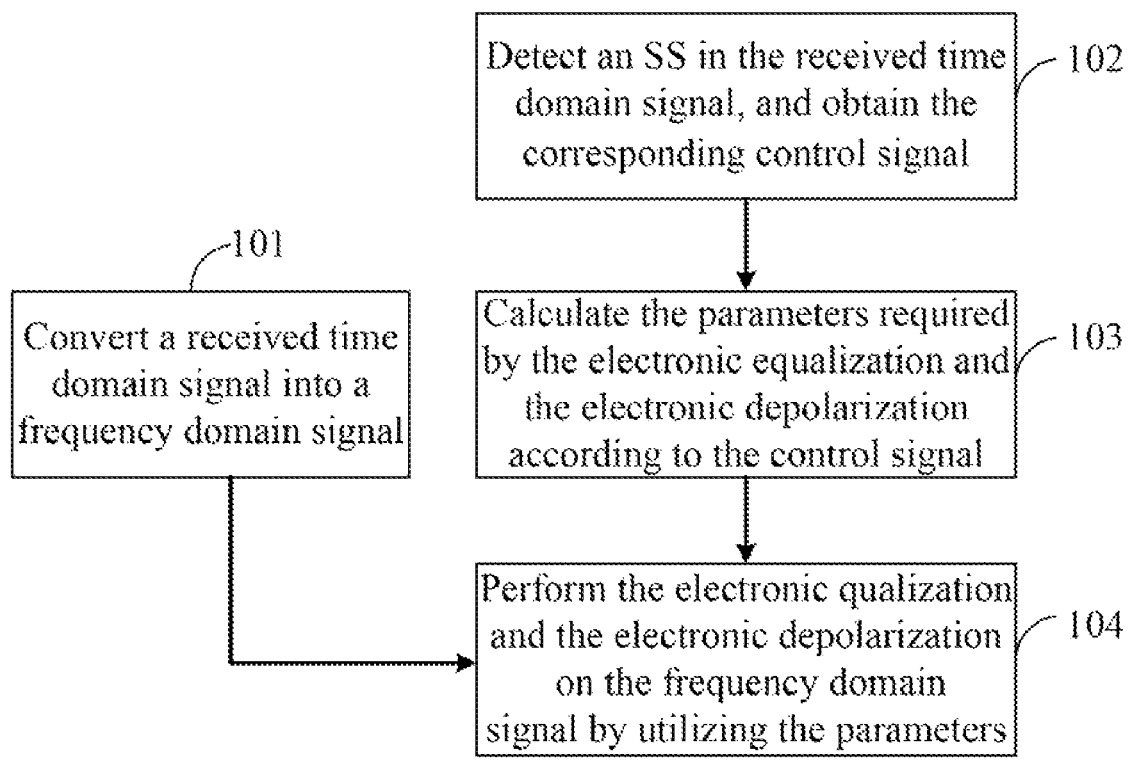
FIG. 1 is a flow chart of an electronic equalization and electronic depolarization method according to Embodiment 1 of the present invention.

In an electronic equalization and electronic depolarization method, in one aspect, a received time domain signal is converted into a frequency domain signal. In another aspect, an SS in the received time domain signal is detected, and a control signal corresponding to a detection situation is obtained, then parameters required by electronic equalization and electronic depolarization are calculated according to the control signal, and finally the electronic equalization and the electronic depolarization are performed on the converted frequency domain signal by utilizing the parameters, that is, the electronic equalization and the electronic depolarization are performed on the received signal in a frequency domain. The received signal generally refers to a time domain signal and a frequency domain signal here. When being located in the time domain, the received signal is referred to as the time domain signal. When being located in the frequency domain, the received signal is referred to as the frequency domain signal, and the SS refers to a signal sequence received after an SS sent by a sending end is transmitted through a channel. Referring to FIG. 1, the processes are as follows:

In step 101, the received time domain signal is converted into the frequency domain signal through a Fast Fourier Transform (FFT).

In step 102, the SS in the received time domain signal is detected, and the corresponding control signal is obtained, and then step 103 is performed. For example, the following method can be adopted.

A sequence of the received time domain signal is intercepted through a moving window. A cross-correlation between the intercepted sequence of the time domain signal and the SS is evaluated. A cross-correlation value is obtained, and the cross-correlation value is compared with a preset threshold. If the cross-correlation value is smaller than the threshold, it is determined that the intercepted time domain signal is not a required sequence, and it is represented that the SS is not detected, and then a control signal indicating that the received time domain signal is not the SS is output; if the cross-correlation value is greater than the threshold, it is determined that the intercepted time domain signal is the required sequence, and it is represented that the SS is detected, and then a control signal indicating that the received time domain signal is the SS is output.

It should be noted that, the length of the moving window is equal to the sequence length of the SS, while the threshold may be set according to operator policies, and the threshold generally may be set as smaller than or equal to 1. Additionally, the cross-correlation value refers to a level of similarity between two paths of signals, and the higher the cross-correlation value is, the higher the level of similarity is.

In step 103, the parameters required by the electronic equalization and the electronic depolarization are calculated according to the control signal, and then step 104 is performed.

For example, when the control signal indicates that the received time domain signal is the SS, the parameters required by the electronic equalization and the electronic depolarization may be obtained by estimating a transmission channel matrix of the frequency domain. For example, firstly direct channels and cross-talk channels of the frequency domain are estimated, and then the parameters required by the electronic equalization and the electronic depolarization are obtained according to a channel matrix formed by the estimated direct channels and the estimated cross-talk channels of the frequency domain; or, at this time, the parameters required by the electronic equalization and the electronic depolarization may be calculated by adopting an adaptive algorithm based on training. However, when the control signal indicates that the received time domain signal is not the SS, that is, the SS is not detected, a channel is tracked through a decision feedback adaptive algorithm, and the parameters required by the electronic equalization and the electronic depolarization are updated, that is, the parameters required by the electronic equalization and the electronic depolarization are calculated, and then original parameters of an equalizer and a depolarizer are updated, or original parameters of an equalization and depolarization device are updated.

In step 104, the electronic equalization and the electronic depolarization are performed on the frequency domain signal by utilizing the parameters calculated in step 103, that is, the electronic equalization and the electronic depolarization are performed on the received signal in a frequency domain.

When the electronic equalization and the electronic depolarization are performed, the electronic equalization and the electronic depolarization may be performed respectively, and the electronic equalization and the electronic depolarization may also be performed simultaneously. For example, while the electronic equalization may be performed on the frequency domain signal through an independent equalizer by utilizing the parameters, the electronic depolarization is performed on the frequency domain signal through an independent depolarizer by utilizing the parameters, and the electronic equalization and the electronic depolarization may also be performed simultaneously by utilizing the parameters through an equalization and depolarization device, such as an MOMO filter.

It should be noted that, step 101 and other steps, such as steps 102, 103 and/or 104 may be performed simultaneously.

It can be known from the foregoing description that, according to the embodiment of the present invention, the parameters required by the electronic equalization and the electronic depolarization are calculated by detecting an SS in a received signal, and then the electronic equalization and the electronic depolarization are performed on the received signal in a frequency domain by utilizing the parameters, so as to solve a problem of the electronic equalization and the electronic depolarization in a PDM OFDM system. Furthermore, the realization complexity, such as calculation complexity and hardware realization complexity, of the electronic equalization and the electronic depolarization performed in the frequency domain is greatly reduced relative to the electronic equalization and the electronic depolarization performed in a time domain.

Embodiment 2

The method according to Embodiment 1 is further exemplified in detail in the following.

Figure 2:
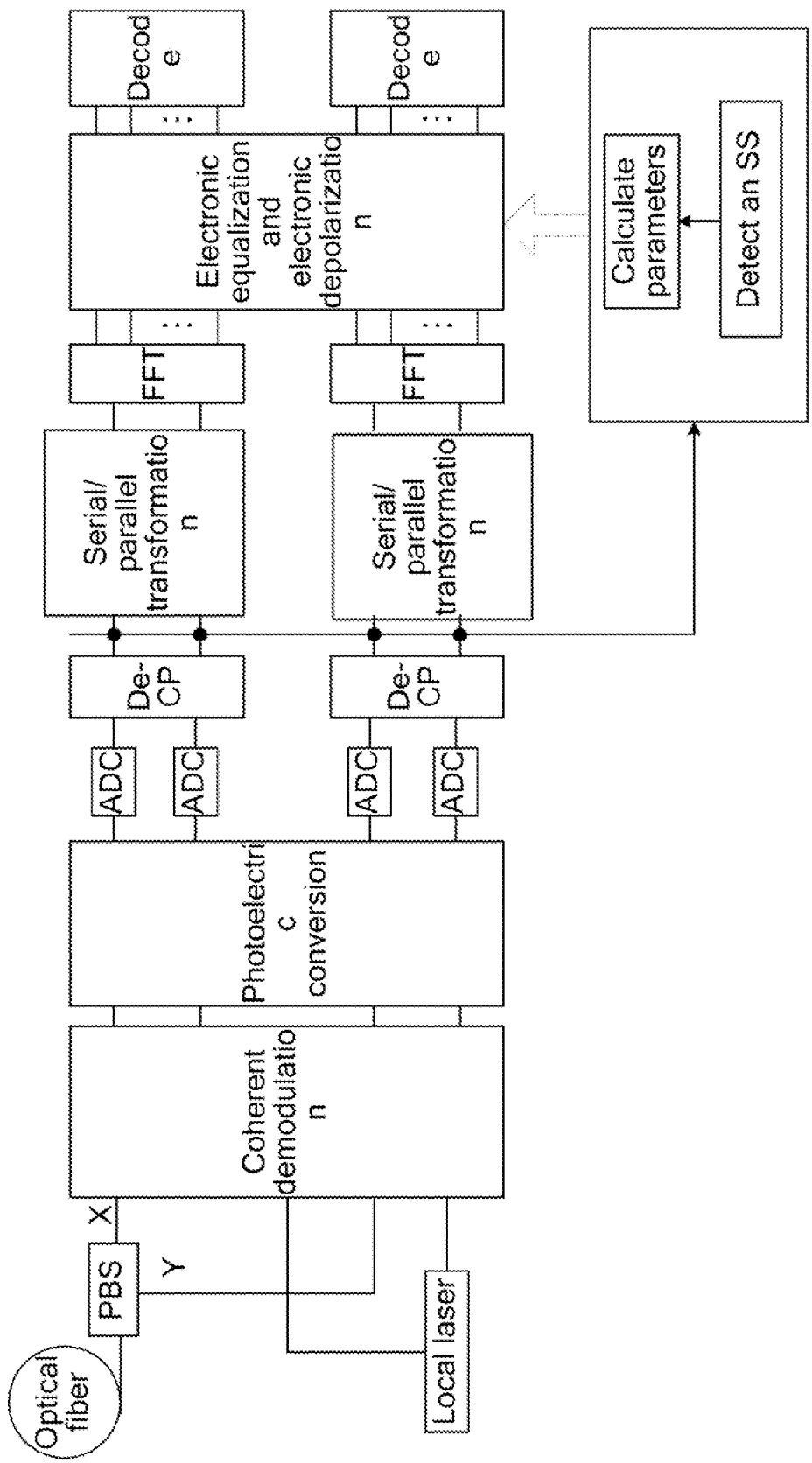
FIG. 2 is a schematic diagram of processing a signal by a receiving end equipment according to Embodiment 2 of the present invention.

To better describe the embodiment of the present invention, FIG. 2 shows a schematic diagram of processing a signal by a receiving end equipment of an embodiment of the present invention (it should be noted that, for convenience of understanding, FIG. 2 further shows processing of other parts in the prior art). The processes are as follows.

A received optical signal is divided into two paths of optical signals through a Polarization Beam Splitter (PBS). The two paths of optical signals are converted into analogue electrical signals respectively through coherent demodulation and photoelectric conversion. The two paths of analogue electrical signals are sampled and quantized into digital baseband signals through an Analog-to-Digital Converter (ADC in FIG. 2). De-CP and serial/parallel transformation processing are performed on the two paths of digital signals, and the time domain signal is converted into the frequency domain signal through the FFT. The electronic equalization and the electronic depolarization are performed on the signal in a frequency domain, and finally the two paths of signals after the depolarization are decoded.

It should be noted that, the embodiment of the present invention is mainly for the part about how to perform the electronic equalization and the electronic depolarization in the frequency domain. As for the rest parts, since they are all well-known technologies, they are not described here. Additionally, for convenience of description, according to the embodiment of the present invention, signals before the FFT (such as the aforementioned digital baseband signal), that is, all signals located in a time domain are referred to as time domain signals, and signals after the FFT are referred to as frequency domain signals.

Figure 3:
FIG. 3 is a schematic diagram of an SS in a time domain signal.

In an OFDM system, usually an SS is inserted into a sent time domain signal periodically for synchronization. As shown in FIG. 3, M SSes are inserted in every N data sequences (or Data Symbol (DS)), in which M>=1 and N>>M. What the SS sends is a training sequence, that is, a known sequence at both a receiving end and a sending end. After receiving the time domain signals, the receiving end equipment, in one aspect, detects the SS in the received time domain signal, obtains the corresponding control signal, and then calculates the parameters required by the electronic equalization and the electronic depolarization according to the control signal, as shown in FIG. 2; in another aspect, converts the received time domain signals into frequency domain signals, and finally performs the electronic equalization and the electronic depolarization on the converted frequency domain signal by utilizing the calculated parameters, which are exemplified in detail in the following.

Figure 4:
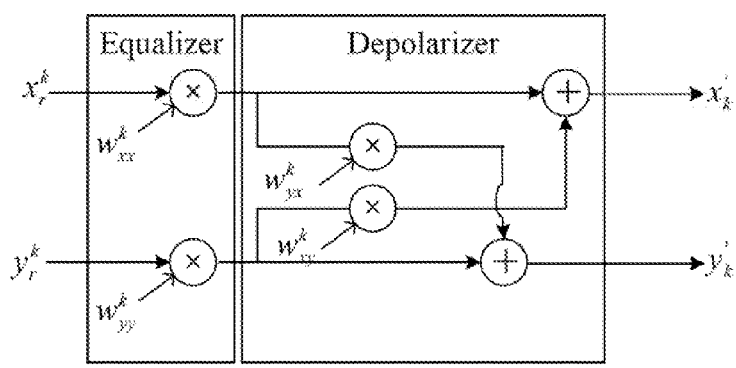
FIG. 4 is a schematic diagram of processing a signal by an equalizer and a depolarizer in a method according to Embodiment 2 of the present invention.

In this embodiment, the electronic equalization and the electronic depolarization are performed respectively, and FIG. 4 shows a schematic diagram of processing a signal by an equalizer and a depolarizer. According to the present invention, the electronic equalization and the electronic depolarization are performed in the frequency domain, so FIG. 4 only shows a schematic diagram of processing a signal by an equalizer and a depolarizer of one sub-channel, and a schematic diagram of processing a signal by an equalizer and a depolarizer of other sub-channel structures are the same as that in FIG. 4.

After the time domain signal is converted into the frequency domain signal, firstly the electronic equalization is performed on the frequency domain signal by utilizing the equalizer, so as to eliminate the channel influence, and then the electronic depolarization is performed on the frequency domain signal after the electronic equalization by utilizing the depolarizer, so as to eliminate the cross-talk between the two paths of signals. The equalizer and the depolarizer are calculated and obtained according to a channel matrix, and the equalizer is represented with a matrix as:

$$W_{eq}^k = \begin{bmatrix} W_{xx}^k & 0 \\ 0 & W_{yy}^k \end{bmatrix}$$

The depolarizer is represented with a matrix as:

$$W_{cmp}^k = \begin{bmatrix} 1 & W_{xy}^k \\ W_{yx}^k & 1 \end{bmatrix}$$

$W_{eq}^k$ represents the equalizer, and $W_{cmp}^k$ represents the depolarizer. $W_{xx}^k$, $W_{yy}^k$, $W_{xy}^k$, and $W_{yx}^k$ in the matrixes are respectively tap coefficients in FIG. 4, that is, the parameters required by the electronic equalization and the electronic depolarization in the embodiment of the present invention.

The following illustrates how to obtain the parameters required by the electronic equalization and the electronic depolarization.

Referring to FIG. 2, after de-CP is performed on the time domain signal, firstly SS detection is performed, then a corresponding control signal is output, and the parameters required by the electronic equalization and the electronic depolarization are calculated according to the control signal, which specifically may be as follows:

Moving window interception (moving interception) is performed on the received time domain signal through a moving window, then a cross-correlation between the time domain signal intercepted through the moving window and the SS is evaluated. A cross-correlation value is obtained, and the cross-correlation value is compared with a preset threshold. If the cross-correlation value is smaller than the threshold, it is determined that the intercepted time domain signal is not a required sequence, and a control signal indicating that the received time domain signal is not the SS is output; if the cross-correlation value is greater than the threshold, it is determined that the intercepted time domain signal is the required sequence, and a control signal indicating that the received time domain signal is the SS is output, and then the parameters required by the electronic equalization and the electronic depolarization are calculated according to the control signal. The length of the moving window is equal to that of the SS. For example, if the length of the moving window is L, a time domain signal with the length of L is intercepted: at the time of 0, a received time domain signal 0-L-1 is intercepted; at the time of 1, a received time domain signal 1-L is intercepted, and so forth.

The parameters required by the electronic equalization and the electronic depolarization may be calculated by estimating a transmission channel matrix, and the channel matrix $H^k$ may be as follows:

$$H^k = \begin{bmatrix} H_{xx}^k & H_{xy}^k \\ H_{yx}^k & H_{yy}^k \end{bmatrix}.$$

$H_{xx}^k$ represents a direct channel of the sent signal in the X polarization state; $H_{xy}^k$ represents a cross-talk channel of the sent signal in the Y polarization state for the sent signal in the X polarization state; $H_{yx}^k$ represents a cross-talk channel of the sent signal in the X polarization state for the sent signal in the Y polarization state; and $H_{yy}^k$ represents a direct channel of the sent signal in the Y polarization state, as shown in BACKGROUND OF THE INVENTION.

(1) When the control signal indicates that the received time domain signal is the SS, that is, when the SS is detected, algorithms such as a least-square algorithm may be adopted to estimate direct channels in two polarization states and cross-talk channels between the two polarization states, that is, the estimated channel matrix $\hat{H}^k$ is:

$$\hat{H}^k = \begin{bmatrix} \hat{H}_{xx}^k & \hat{H}_{xy}^k \\ \hat{H}_{yx}^k & \hat{H}_{yy}^k \end{bmatrix}$$

$\hat{H}^k$ represents an estimated value for $H^k$; $\hat{H}_{xx}^k$ represents an estimated value for $H_{xx}^k$; $\hat{H}_{xy}^k$ represents an estimated value for $H_{xy}^k$; $\hat{H}_{yx}^k$ represents an estimated value for $H_{yx}^k$; and $\hat{H}_{yy}^k$ represents an estimated value for $H_{yy}^k$.

After the direct channels and the cross-talk channels, that is, $\hat{H}_{xx}^k$, $\hat{H}_{xy}^k$, $\hat{H}_{yx}^k$, and $\hat{H}_{yy}^k$, are calculated (estimated), the parameters required by the electronic equalization and the electronic depolarization, that is, the tap coefficients of the equalizer and the depolarizer, may be obtained according to the calculated direct channels and cross-talk channels. The equalizer is configured to eliminate the influence of the direct channels, so the equalizer is a reciprocal of the estimated direct channel.

$$\frac{1}{\hat{H}_{xx}^k} \text{ and } \frac{1}{\hat{H}_{yy}^k}$$

are substituted into the previous matrix to represent the equalizer, and an equalizer is obtained as:

$$W_{eq}^k = \begin{bmatrix} \dfrac{1}{\hat{H}_{xx}^k} & 0 \\ 0 & \dfrac{1}{\hat{H}_{yy}^k} \end{bmatrix}$$

It can be deduced from the foregoing description that, the channel matrix $H_{eq}^k$ after the electronic equalization is:

$$H_{eq}^k = W_{eq}^k H^k$$

$$= \begin{bmatrix} \frac{1}{\hat{H}_{xx}^k} & 0 \\ 0 & \frac{1}{\hat{H}_{yy}^k} \end{bmatrix} \begin{bmatrix} H_{xx}^k & H_{xy}^k \\ H_{yx}^k & H_{yy}^k \end{bmatrix}$$

$$= \begin{bmatrix} \frac{H_{xx}^k}{\hat{H}_{xx}^k} & \frac{H_{xy}^k}{\hat{H}_{xx}^k} \\ \frac{H_{yx}^k}{\hat{H}_{yy}^k} & \frac{H_{yy}^k}{\hat{H}_{yy}^k} \end{bmatrix}$$

After the electronic equalization is performed on the frequency domain signal, the electronic depolarization needs to be performed, so it can be deduced that, the channel matrix $H_{cmp}^k$ after the depolarization is:

$$H_{cmp}^k = W_{cmp}^k H_{eq}^k$$

$$= \begin{bmatrix} 1 & W_{xy}^k \\ W_{yx}^k & 1 \end{bmatrix} \begin{bmatrix} \frac{H_{xx}^k}{\hat{H}_{xx}^k} & \frac{H_{xy}^k}{\hat{H}_{xx}^k} \\ \frac{H_{yx}^k}{\hat{H}_{yy}^k} & \frac{H_{yy}^k}{\hat{H}_{yy}^k} \end{bmatrix}$$

$$= \begin{bmatrix} \frac{H_{xx}^k}{\hat{H}_{xx}^k} + \frac{H_{yx}^k}{\hat{H}_{yy}^k} W_{xy}^k & \frac{H_{xy}^k}{\hat{H}_{xx}^k} + \frac{H_{yy}^k}{\hat{H}_{yy}^k} W_{xy}^k \\ \frac{H_{xx}^k}{\hat{H}_{xx}^k} W_{yx}^k + \frac{H_{yx}^k}{\hat{H}_{yy}^k} & \frac{H_{xy}^k}{\hat{H}_{xx}^k} W_{yx}^k + \frac{H_{yy}^k}{\hat{H}_{yy}^k} \end{bmatrix}$$

An ideal electronic depolarization state is that the channel matrix after the electronic depolarization is a diagonal matrix, so, assuming that it is intended to achieve the ideal state, that is $$\frac{H_{xy}^k}{\hat{H}_{xx}^k} + \frac{H_{yy}^k}{\hat{H}_{yy}^k} W_{xy}^k = 0$$

$$\frac{H_{xx}^k}{\hat{H}_{xx}^k} W_{yx}^k + \frac{H_{yx}^k}{\hat{H}_{yy}^k} = 0$$

to deduce $$W_{xy}^k = -\frac{\hat{H}_{yy}^k}{H_{yy}^k} \cdot \frac{H_{xy}^k}{\hat{H}_{xx}^k} \approx -\frac{H_{xy}^k}{\hat{H}_{xx}^k}$$

$$W_{yx}^k = -\frac{\hat{H}_{xx}^k}{H_{xx}^k} \cdot \frac{H_{yx}^k}{\hat{H}_{yy}^k} \approx -\frac{\hat{H}_{yx}^k}{\hat{H}_{yy}^k}$$

Therefore, values of $W_{xy}^k$ and $W_{yx}^k$ are substituted into the matrix to represent the depolarizer, and the depolarizer may be obtained as:

$$W_{cmp}^k = \begin{bmatrix} 1 & -\frac{\hat{H}_{xy}^k}{\hat{H}_{xx}^k} \\ -\frac{\hat{H}_{yx}^k}{\hat{H}_{yy}^k} & 1 \end{bmatrix}$$

In this way, the electronic equalization and the electronic depolarization may be performed on the frequency domain signal through the equalizer and the depolarizer.

(2) When the control signal indicates that the received time domain signal is not the SS, that is, when the SS is not detected, such as what is detected is a data sequence, a decision feedback adaptive algorithm may be adopted to track a channel, and the parameters, that is, the tap coefficient $W_{xx}^k$, $W_{yy}^k$, $W_{xy}^k$, and $W_{yx}^k$ in the equalizer and the depolarizer, required by the electronic equalization and the electronic depolarization are updated. The decision feedback adaptive algorithm may be as follows.

Assuming that the frequency domain signals after the electronic equalization and the electronic depolarization are $X'_k(n)$ and $Y'_k(n)$, n represents the time of n; decision processing is performed on $X'_k(n)$ and $Y'_k(n)$; signals after the decision are obtained as $\hat{X}'_k(n)$ and $\hat{Y}'_k(n)$; and an error is obtained as $$e_x^k(n) = \hat{X}'_k(n) - X'_k(n) \text{ and } e_y^k(n) = \hat{Y}'_k(n) - Y'_k(n)$$

Iteration update formulas are $$W_{xx}^k(n+1) = W_{xx}^k(n) + \mu \cdot X_r^k(n) \cdot e_x^k$$

$$W_{xy}^k(n+1) = W_{xy}^k(n) + \mu \cdot Y_r^k(n) \cdot e_x^k$$

$$W_{yx}^k(n+1) = W_{yx}^k(n) + \mu \cdot X_r^k(n) \cdot e_y^k$$

$$W_{yy}^k(n+1) = W_{yy}^k(n) + \mu \cdot Y_r^k(n) \cdot e_y^k$$

μ represents a step; $W_{xx}^k(n+1)$ represents $W_{xx}^k$ at the time of (n+1); $W_{yy}^k(n+1)$ represents $W_{yy}^k$ at the time of (n+1); $W_{xy}^k(n+1)$ represents $W_{xy}^k$ at the time of (n+1); $W_{yx}^k(n+1)$ represents $W_{yx}^k$ at the time of (n+1); the calculated errors $e_x^k$ and $e_y^k$ are substituted into the iteration update formulas to respectively obtain values of $W_{xx}^k(n+1)$, $W_{yy}^k(n+1)$, $W_{xy}^k(n+1)$, and $W_{yx}^k(n+1)$; $W_{xx}^k(n+1)$, $W_{yy}^k(n+1)$, $W_{xy}^k(n+1)$, and $W_{yx}^k(n+1)$ are substituted into the equalizer and the depolarizer to complete the update of the parameters of the equalizer and the depolarizer, and then the electronic equalization and the electronic depolarization are performed on the frequency domain signal by utilizing the parameters after the update.

Figure 5:
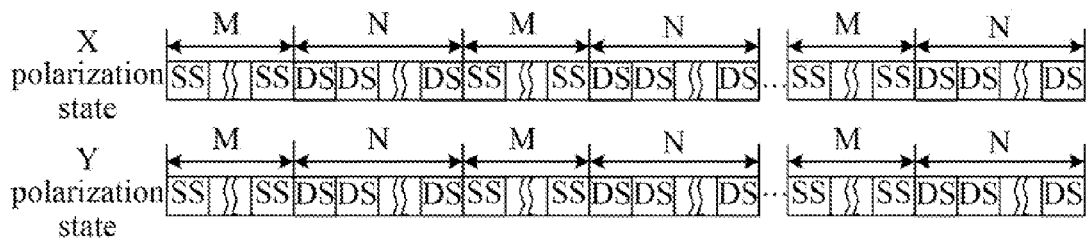
FIG. 5 is a schematic diagram of an SS in two polarization states in the method according to Embodiment 2 of the present invention.

It should be noted that, in this embodiment, the cross-talk channel needs to be estimated, so the SS of a signal sent in the X polarization state needs to be synchronized with the SS of a signal sent in the Y polarization state, as shown in FIG. 5.

It can be known from the foregoing description that, according to the embodiment of the present invention, parameters required by electronic equalization and electronic depolarization are calculated with the algorithms such as the least-square algorithm by detecting an SS in a received signal, and then the electronic equalization and the electronic depolarization are performed on the received signal in the frequency domain by utilizing the parameters, so as to solve a problem of the electronic equalization and the electronic depolarization in a PDM OFDM system. Furthermore, the realization complexity of the electronic equalization and the electronic depolarization performed in the frequency domain is greatly reduced relative to the electronic equalization and the electronic depolarization performed in the time domain.

Embodiment 3

In this embodiment, an equalizer, a depolarizer, and detection of an SS in a time domain signal are the same as those in Embodiment 2, but parameters required by electronic equalization and electronic depolarization are calculated in other manners, which is as follows.

(1) When a control signal indicates that a received time domain signal is an SS, that is, when the SS is detected, the parameters required by the electronic equalization and the electronic depolarization are calculated by adopting an adaptive algorithm based on training.

The iteration formula of the adaptive algorithm based on training is the same as the formula of the decision feedback adaptive algorithm, and the only difference is the method for calculating the error. The SS is known to both the sending end and the receiving end. Assuming that a signal sent in an X polarization state is $X_t^k$, and a signal sent in a Y polarization state is $Y_t^k$, the signals are $X'_k(n)$ and $Y'_k(n)$ respectively after the electronic equalization and the electronic depolarization, n represents the time of n, and an error is:

$$e_x^k(n)=X_t^k(n)-X'_k(n) \text{ and } e_y^k(n)=Y_t^k(n)-Y'_k(n)$$

The same as Embodiment 2, the iteration update formulas are:

$$W_{xx}^k(n+1)=W_{xx}^k(n)+\mu \cdot X_r^k(n) \cdot e_x^k$$

$$W_{xy}^k(n+1)=W_{xy}^k(n)+\mu \cdot Y_r^k(n) \cdot e_x^k$$

$$W_{yx}^k(n+1)=W_{yx}^k(n)+\mu \cdot X_r^k(n) \cdot e_y^k$$

$$W_{yy}^k(n+1)=W_{yy}^k(n)+\mu \cdot Y_r^k(n) \cdot e_y^k$$

As in Embodiment 2, $\mu$ represents a step; $W_{xx}^k(n+1)$ represents $W_{xx}^k$ at the time of (n+1); $W_{yy}^k(n+1)$ represents $W_{yy}^k$ at the time of (n+1); $W_{xy}^k(n+1)$ represents $W_{xy}^k$ at the time of (n+1); $W_{yx}^k(n+1)$ represents $W_{yx}^k$ at the time of (n+1); calculated errors $e_x^k$ and $e_y^k$ are substituted into the iteration update formulas to respectively obtain values of $W_{xx}^k(n+1)$, $W_{yy}^k(n+1)$, $W_{xy}^k(n+1)$, and $W_{yx}^k(n+1)$; $W_{xx}^k(n+1)$, $W_{yy}^k(n+1)$, $W_{xy}^k(n+1)$, and $W_{yx}^k(n+1)$ are substituted into the equalizer and the depolarizer and then the electronic equalization and the electronic depolarization are performed on a frequency domain signal by utilizing the parameters.

(2) When the control signal indicates that the received time domain signal is not the SS, that is, when the SS is not detected, a channel is tracked by adopting the decision feedback adaptive algorithm, and each parameter of the equalizer and the depolarizer is updated, which is the same as Embodiment 2, and is not repeated here.

Figure 6:
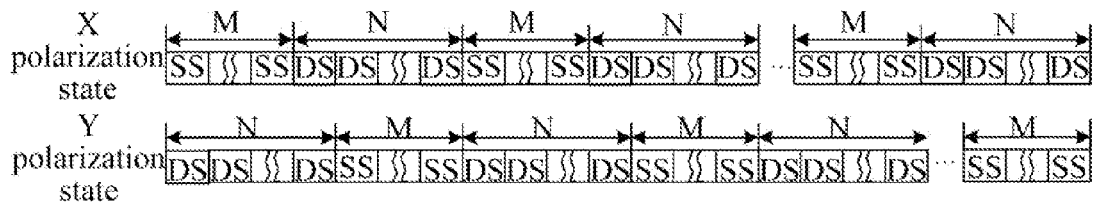
FIG. 6 is a schematic diagram of an SS in two polarization states in a method according to Embodiment 3 of the present invention.

In this embodiment, a cross-talk channel is not required to be estimated, so an SS of a signal sent in the X polarization state may not be required to be capable of being synchronized with an SS of a signal sent in the Y polarization state, as shown in FIG. 6.

It can be known from the foregoing description that, according to the embodiment of the present invention, the parameters required by the electronic equalization and the electronic depolarization are calculated with algorithms such as the adaptive algorithm based on training by detecting an SS in a received signal, and then the electronic equalization and the electronic depolarization are performed on the received signal in a frequency domain by utilizing the parameters, so as to solve a problem of the electronic equalization and the electronic depolarization in a PDM OFDM system. Furthermore, the realization complexity of the electronic equalization and the electronic depolarization performed in the frequency domain is greatly reduced relative to the electronic equalization and the electronic depolarization performed in a time domain.

Embodiment 4

Figure 7:
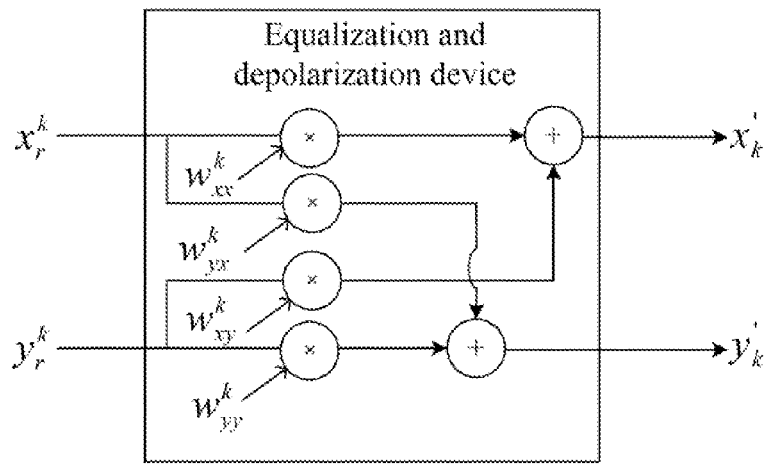
FIG. 7 is a schematic diagram of processing a signal by an equalization and depolarization device in a method according to Embodiment 4 of the present invention.

This embodiment adopts a solution being the same as that in Embodiment 2 to detect an SS and calculate parameters required by electronic equalization and electronic depolarization, and differs from Embodiment 2 in that, in this embodiment, the electronic equalization and the electronic depolarization are performed on a frequency domain signal simultaneously. For convenience of description, the module which may perform the electronic equalization and the electronic depolarization on the frequency domain signal simultaneously is referred to as an equalization and depolarization device (filter), as shown in FIG. 7. It should be noted that, according to the present invention, the electronic equalization and the electronic depolarization are performed in a frequency domain, so FIG. 7 only shows a schematic diagram of processing a signal by an equalization and depolarization device of one sub-channel, and a schematic diagram of processing a signal by an equalization and depolarization device of other sub-channel structures is the same as that in FIG. 7.

It can be known from FIG. 7 that, the equalization and depolarization device adopts an MIMO filtering structure to perform equalization and depolarization, which is represented with a matrix as:

$$W^k = \begin{bmatrix} W_{xx}^k & W_{xy}^k \\ W_{yx}^k & W_{yy}^k \end{bmatrix}$$

$W_{xx}^k$, $W_{yy}^k$, $W_{xy}^k$, and $W_{yx}^k$ in the matrixes are respectively tap coefficients in FIG. 7, that is, the parameters required by the electronic equalization and the electronic depolarization in the embodiment of the present invention. The calculation of the parameters required by the electronic equalization and the electronic depolarization may adopt the method according to Embodiment 2, and for details, reference may be made to Embodiment 2.

(1) When a control signal indicates that a received time domain signal is an SS, that is, when the SS is detected, algorithms such as a least-square algorithm may be adopted to estimate direct channels in two polarization states and cross-talk channels between the two polarization states, that is, the estimated channel matrix $\hat{H}^k$ is:

$$\hat{H}^k = \begin{bmatrix} \hat{H}_{xx}^k & \hat{H}_{xy}^k \\ \hat{H}_{yx}^k & \hat{H}_{yy}^k \end{bmatrix}$$

After the direct channels and the cross-talk channels, that is, $\hat{H}_{xx}^k$, $\hat{H}_{xy}^k$, $\hat{H}_{yx}^k$, and $\hat{H}_{yy}^k$, are calculated (estimated), the parameters required by the electronic equalization and the electronic depolarization, that is, the tap coefficients of the equalization and depolarization device, may be obtained according to the calculated direct channels and cross-talk channels. The following analyzes how to calculate the tap coefficients of the equalization and depolarization device.

Referring to BACKGROUND OF THE INVENTION, a mathematical model of transmission in the channel is represented with a matrix as:

$$\begin{bmatrix} X_r^k \\ Y_r^k \end{bmatrix} = \begin{bmatrix} H_{xx}^k & H_{xy}^k \\ H_{yx}^k & H_{yy}^k \end{bmatrix} \begin{bmatrix} X_t^k \\ Y_t^k \end{bmatrix}$$

$[\bullet]^k$ represents the $k^{th}$ sub-channel; $X_t^k$ is the sent signal in the X polarization state; $X_r^k$ is the received signal in the X' polarization state; $Y_t^k$ is the sent signal in the Y polarization state; $Y_r^k$ is the received signal in the Y' polarization state; $H_{xx}^k$ represents a direct channel of the sent signal in the X polarization state; $H_{xy}^k$ represents a cross-talk channel of the sent signal in the Y polarization state for the sent signal in the X polarization state; $H_{yx}^k$ represents a cross-talk channel of the sent signal in the X polarization state for the sent signal in the Y polarization state; and $H_{yy}^k$ represents a direct channel of the sent signal in the Y polarization state. It can be known from Embodiment 2 that:

$$H^k = \begin{bmatrix} H_{xx}^k & H_{xy}^k \\ H_{yx}^k & H_{yy}^k \end{bmatrix}$$

It is substituted to obtain:

$$\begin{bmatrix} X_r^k \\ Y_r^k \end{bmatrix} = H^k \begin{bmatrix} X_t^k \\ Y_t^k \end{bmatrix}$$

to deduce:

$$X_r^k = H_{xx}^k \cdot X_t^k + H_{xy}^k \cdot Y_t^k$$

$$Y_r^k = H_{yx}^k \cdot X_t^k + H_{yy}^k \cdot Y_t^k$$

It is intended that the received signals $X_r^k$ and $Y_r^k$ are not influenced by the channel and the cross-talk, that is, intended that $X_r^k = X_t^k$, and $Y_r^k = Y_t^k$. It can be known from $X_r^k = H_{xx}^k \cdot X_t^k + H_{xy}^k \cdot Y_t^k$ and $Y_r^k = H_{yx}^k \cdot X_t^k + H_{yy}^k \cdot Y_t^k$ that, $X_r^k$ and $Y_r^k$ are influenced by the direct channels ($H_{xx}^k$ and $H_{yy}^k$ in the foregoing formula) and the cross-talks ($H_{xy}^k \cdot Y_t^k$ and $H_{yx}^k \cdot X_t^k$ in the foregoing formula). Therefore, it is intended that after the received signals $X_r^k$ and $Y_r^k$ pass through processing of the equalization and depolarization module, the influences may be eliminated. It can be known from FIG. 7 that, after passing through the electronic equalization and the electronic depolarization of the equalization and depolarization device, the signals $X'_k$ and $Y'_k$ respectively are:

$$X'_k = W_{xx}^k X_r^k + W_{xy}^k Y_r^k$$

$$Y'_k = W_{yx}^k X_r^k + W_{yy}^k Y_r^k$$

which are represented with a matrix as:

$$\begin{bmatrix} X'_k \\ Y'_k \end{bmatrix} = \begin{bmatrix} W_{xx}^k & W_{xy}^k \\ W_{yx}^k & W_{yy}^k \end{bmatrix} \begin{bmatrix} X_r^k \\ Y_r^k \end{bmatrix}$$

Because $$\begin{bmatrix} X_r^k \\ Y_r^k \end{bmatrix} = H^k \begin{bmatrix} X_t^k \\ Y_t^k \end{bmatrix}, \text{ and } H^k = \begin{bmatrix} H_{xx}^k & H_{xy}^k \\ H_{yx}^k & H_{yy}^k \end{bmatrix},$$

they are substituted to obtain $$\begin{bmatrix} X'_k \\ Y'_k \end{bmatrix} = \begin{bmatrix} W_{xx}^k & W_{xy}^k \\ W_{yx}^k & W_{yy}^k \end{bmatrix} \begin{bmatrix} H_{xx}^k & H_{xy}^k \\ H_{yx}^k & H_{yy}^k \end{bmatrix} \begin{bmatrix} X_t^k \\ Y_t^k \end{bmatrix} = W^k H^k \begin{bmatrix} X_t^k \\ Y_t^k \end{bmatrix}$$

When $$W^k H^k = I, \begin{bmatrix} X'_k \\ Y'_k \end{bmatrix} = \begin{bmatrix} X_t^k \\ Y_t^k \end{bmatrix},$$

$W^k = (\hat{H}^k)^{-1}$ can be deduced.

That is, tap coefficient of the equalization and depolarization device is:

$W^k = (\hat{H}^k)^{-1}$

The tap coefficient is substituted into the equalization and depolarization device, and then the electronic equalization and the electronic depolarization are performed on the frequency domain signal.

(2) When the control signal indicates that the received time domain signal is not the SS, that is, when the SS is not detected, a channel is tracked by adopting a decision feedback adaptive algorithm, and each parameter of the equalization and depolarization device is updated, which is similar to Embodiment 2, and is not repeated here.

It should be noted that, in this embodiment, same as Embodiment 2, the cross-talk channel needs to be estimated, so an SS of a signal sent in the X polarization state needs to be synchronized with an SS of a signal sent in the Y polarization state, as shown in FIG. 5.

It can be known from the foregoing description that, according to the embodiment of the present invention, the parameters required by the electronic equalization and the electronic depolarization are calculated with the algorithms such as the least-square algorithm by detecting the SS in the received signal, and then the electronic equalization and the electronic depolarization are performed on the received signal simultaneously in a frequency domain by utilizing the parameters, so as to solve a problem of the electronic equalization and the electronic depolarization in a PDM OFDM system. Furthermore, the realization complexity of the electronic equalization and the electronic depolarization performed in the frequency domain is greatly reduced relative to the electronic equalization and the electronic depolarization performed in a time domain.

Embodiment 5

In this embodiment, a solution for electronic equalization and electronic depolarization being the same as that in Embodiment 4 is adopted, that is, the electronic equalization and the electronic depolarization are performed on a frequency domain signal simultaneously, and detection of an SS in a time domain signal is also consistent with that in Embodiment 3, but the difference from Embodiment 3 lies in that, in this embodiment, parameters required by electronic equalization and electronic depolarization are calculated in other manners.

(1) When a control signal indicates that a received time domain signal is an SS, that is, when the SS is detected, the parameters required by the electronic equalization and the electronic depolarization are calculated by adopting an adaptive algorithm based on training.

The iteration formula of the adaptive algorithm based on training is the same as the formula of the decision feedback adaptive algorithm, and the only difference is the method for calculating the error. The SS is known to both the sending end and the receiving end. Assuming that a signal sent in an X polarization state is $X_t^k$, and a signal sent in a Y polarization state is $Y_t^k$, the signals are $X'_k(n)$ and $Y'_k(n)$ respectively after the electronic equalization and the electronic depolarization, n represents the time of n, and an error is:

$$e_x^k(n)=X_t^k(n)-X'_k(n) \text{ and } e_y^k(n)=Y_t^k(n)-Y'_k(n)$$

The iteration update formulas are:

$$W_{xx}^k(n+1)=W_{xx}^k(n)+\mu \cdot X_r^k(n) \cdot e_x^k$$

$$W_{xy}^k(n+1)=W_{xy}^k(n)+\mu \cdot Y_r^k(n) \cdot e_x^k$$

$$W_{yx}^k(n+1)=W_{yx}^k(n)+\mu \cdot X_r^k(n) \cdot e_y^k$$

$$W_{yy}^k(n+1)=W_{yy}^k(n)+\mu \cdot Y_r^k(n) \cdot e_y^k$$

$\mu$ represents a step; $W_{xx}^k(n+1)$ represents $W_{xx}^k(n+1)$ represents $W_{xx}^k$ at the time of $(n+1)$; $W_{yy}^k(n+1)$ represents $W_{yy}^k$ at the time of $(n+1)$; $W_{xy}^k(n+1)$ represents $W_{xy}^k$ at the time of $(n+1)$; $W_{yx}^k(n+1)$ represents $W_{yx}^k$ at the time of $(n+1)$; calculated errors $e_x^k$ and $e_y^k$ are substituted into the iteration update formulas to respectively obtain values of $W_{xx}^k(n+1)$, $W_{yy}^k(n+1)$, $W_{xy}^k(n+1)$, and $W_{yx}^k(n+1)$; $W_{xx}^k(n+1)$, $W_{yy}^k(n+1)$, $W_{xy}^k(n+1)$, and $W_{yx}^k(n+1)$ are substituted into an equalization and depolarization device, and then the electronic equalization and the electronic depolarization are performed on the frequency domain signal by utilizing the parameters.

(2) When a control signal indicates that the received time domain signal is not the SS, that is, when the SS is not detected, a channel is tracked by adopting the decision feedback adaptive algorithm, and each parameter of the equalization and depolarization device is updated, which is similar to Embodiment 2, and is not repeated here.

In this embodiment, a cross-talk channel is not required to be estimated, so an SS of a signal sent in the X polarization state may not be required to be capable of being synchronized with an SS of a signal sent in the Y polarization state, as shown in FIG. 6.

It can be known from the foregoing description that, according to the embodiment of the present invention, the parameters required by the electronic equalization and the electronic depolarization are calculated with algorithms such as the adaptive algorithm based on training by detecting an SS in a received signal, and then the electronic equalization and the electronic depolarization are performed on the received signal simultaneously in a frequency domain by utilizing the parameters, so as to solve a problem of the electronic equalization and the electronic depolarization in a PDM OFDM system. Furthermore, the realization complexity of the electronic equalization and the electronic depolarization performed in the frequency domain is greatly reduced relative to the electronic equalization and the electronic depolarization performed in a time domain.

Embodiment 6

Figure 8:
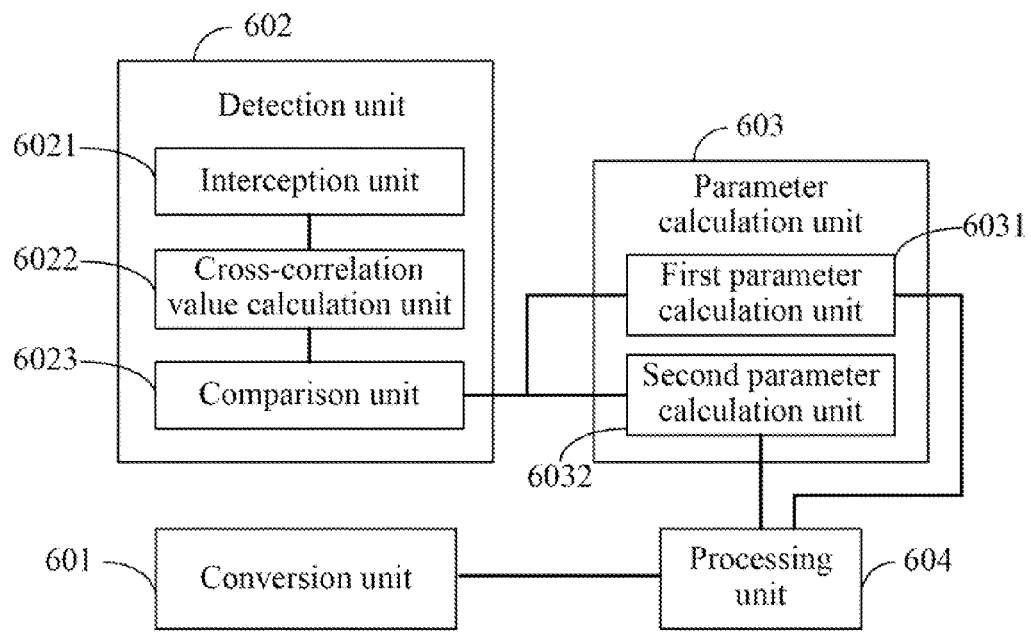
FIG. 8 is a schematic structural diagram of a receiving end equipment according to Embodiment 6 of the present invention.

To better implement the foregoing method, an embodiment of the present invention further provides a receiving end equipment correspondingly. As shown in FIG. 8, the receiving end equipment includes a conversion unit 601, a detection unit 602, a parameter calculation unit 603, and a processing unit 604.

The conversion unit 601 is configured to convert a received time domain signal into a frequency domain signal. For example, the conversion unit 601 may be an FFT module, which converts the received time domain signal into the frequency domain signal through FFT, and the size of the FFT module may be determined according to the number of sub-channels.

The detection unit 602 is configured to detect an SS in the received time domain signal, and obtain a corresponding control signal.

The parameter calculation unit 603 is configured to calculate (or estimate) parameters required by electronic equalization and electronic depolarization according to the control signal obtained by the detection unit. For example, algorithms such as a least-square algorithm may be adopted to estimate a channel matrix, and then the parameters required by the electronic equalization and the electronic depolarization are calculated according to the estimated channel matrix, or the parameters required by the electronic equalization and the electronic depolarization are estimated by adopting algorithms such as an adaptive algorithm based on training.

The processing unit 604 is configured to perform the electronic equalization and the electronic depolarization on the frequency domain signal converted by the conversion unit 601 by utilizing the parameters calculated by the parameter calculation unit 603.

As shown in FIG. 8, the detection unit 602 may include an interception unit 6021, a cross-correlation value calculation unit 6022, and a comparison unit 6023.

The interception unit 6021 is configured to intercept the received time domain signal through a moving window.

The cross-correlation value calculation unit 6022 is configured to evaluate a cross-correlation between the time domain signal intercepted by the interception unit 6021 and the SS, and obtain a cross-correlation value.

The comparison unit 6023 is configured to compare the cross-correlation value obtained by the cross-correlation value calculation unit 6022 with a preset threshold, determine that the intercepted time domain signal is not a required sequence if the cross-correlation value is smaller than the threshold, which represents that the SS is not detected, and then output a control signal indicating that the received time domain signal is not the SS; determine that the intercepted time domain signal is the required sequence if the cross-correlation value is greater than the threshold, which represents that the SS is detected, and then output a control signal indicating that the received time domain signal is the SS.

As shown in FIG. 8, the parameter calculation unit 603 may include a first parameter calculation unit 6031 and a second parameter calculation unit 6032.

The first parameter calculation unit 6031 is configured to obtain the parameters required by the electronic equalization and the electronic depolarization by estimating (calculating) a channel matrix when the control signal obtained by the detection unit 602 indicates that the received time domain signal is the SS. For example, firstly direct channels and cross-talk channels of a frequency domain are estimated, and then the parameters required by the electronic equalization and the electronic depolarization are obtained according to a channel matrix formed by the estimated direct channels and the estimated cross-talk channels of the frequency domain.

When the channel matrix is calculated, algorithms such as a least-square algorithm may be adopted for calculation, and for details, reference may be made to Embodiment 2 and Embodiment 4.

The second parameter calculation unit 6032 is configured to calculate the parameters required by the electronic equalization and the electronic depolarization through a decision feedback adaptive algorithm when the control signal obtained by the detection unit 602 indicates that the received time domain signal is not the SS. For details, reference may be made to Embodiment 2.

Figure 9:
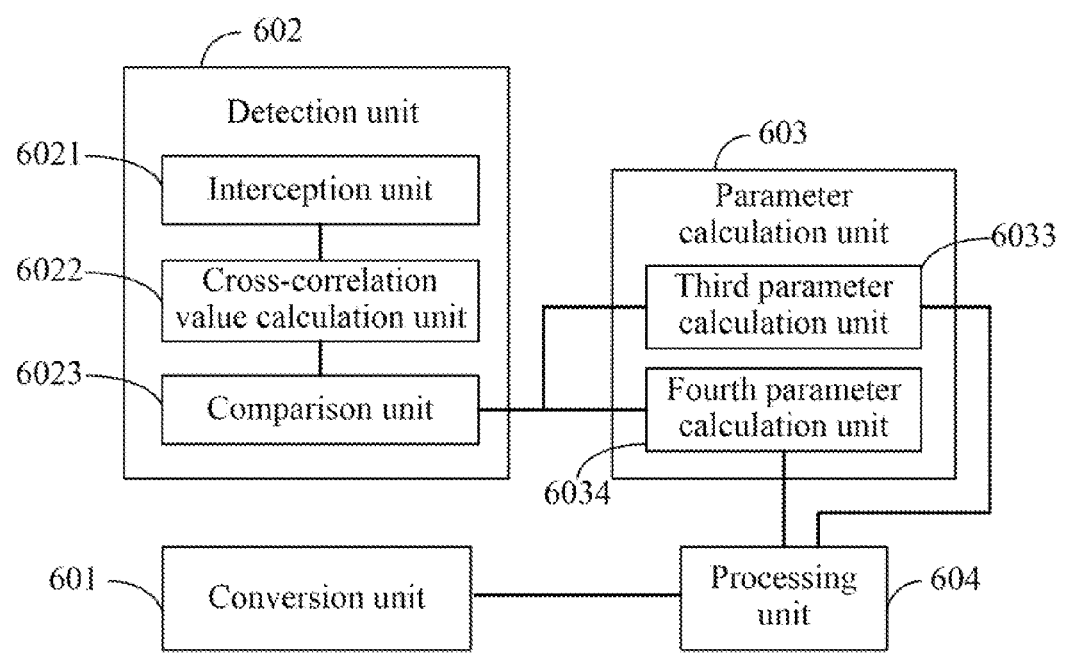
FIG. 9 is a schematic structural diagram of a receiving end equipment according to Embodiment 6 of the present invention.

Alternatively, as shown in FIG. 9, the parameter calculation unit 603 may also include a third parameter calculation unit 6033 and a fourth parameter calculation unit 6034.

The third parameter calculation unit 6033 is configured to calculate the parameters required by the electronic equalization and the electronic depolarization by adopting the adaptive algorithm based on training when the control signal obtained by the detection unit 602 indicates that the received time domain signal is the SS. For details, reference may be made to Embodiment 3 and Embodiment 5.

The fourth parameter calculation unit 6034 is configured to calculate the parameters required by the electronic equalization and the electronic depolarization through the decision feedback adaptive algorithm when the control signal obtained by the detection unit 602 indicates that the received time domain signal is not the SS. For details, reference may be made to Embodiment 2.

The processing unit 604 may be several equalization and depolarization devices, such as several modules in an MOMO filtering structure, and may also include several independent depolarizers and equalizers; the numbers of the depolarizers and the equalizers, or the number of the equalization and depolarization devices may be determined according to the number of the sub-channels.

The depolarizer is configured to perform the electronic depolarization on the frequency domain signal converted by the conversion unit 601 by utilizing the parameters calculated by the parameter calculation unit 603.

The equalizer is configured to perform the electronic equalization on the frequency domain signal converted by the conversion unit 601 by utilizing the parameters calculated by the parameter calculation unit 603.

It can be known from the foregoing description that, in the receiving end equipment according to the embodiment of the present invention, the parameter calculation unit 603 calculates the parameters required by the electronic equalization and the electronic depolarization by detecting the SS in the received signal by the detection unit 602, and then the processing unit 604 performs the electronic equalization and the electronic depolarization on the received signal in the frequency domain by utilizing the parameters, so as to solve a problem of the electronic equalization and the electronic depolarization in a PDM OFDM system. Furthermore, the realization complexity of the electronic equalization and the electronic depolarization performed in the frequency domain is greatly reduced relative to the electronic equalization and the electronic depolarization performed in a time domain.

Embodiment 7

Figure 10:
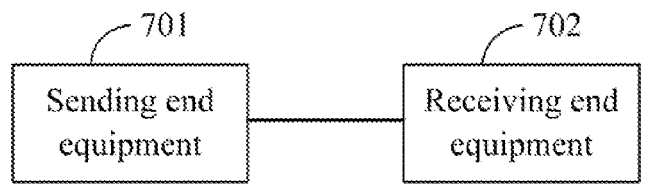
FIG. 10 is a schematic structural diagram of another communication device according to Embodiment 7 of the present invention.

To better implement the foregoing method, an embodiment of the present invention further provides a communication system correspondingly. As shown in FIG. 10, the communication system includes a sending end equipment 701 and a receiving end equipment 702.

The sending end equipment 701 is configured to send a time domain signal to the receiving end equipment.

The receiving end equipment 702 is configured to receive the time domain signal sent by the sending end equipment 701, convert the received time domain signal into a frequency domain signal, detect an SS in the received time domain signal, obtain a corresponding control signal, calculate parameters required by electronic equalization and electronic depolarization according to the control signal, and perform the electronic equalization and the electronic depolarization on the converted frequency domain signal by utilizing the parameters.

The receiving end equipment 702 is further configured to intercept the received time domain signal through a moving window, evaluate a cross-correlation between the intercepted time domain signal and the SS, obtain a cross-correlation value, and compare the cross-correlation value with a preset threshold, determine that the intercepted time domain signal is not a required sequence if the cross-correlation value is smaller than the threshold, which represents that the SS is not detected, and then output a control signal indicating that the received time domain signal is not the SS; determine that the intercepted time domain signal is the required sequence if the cross-correlation value is greater than the threshold, which represents that the SS is detected, and then output a control signal indicating that the received time domain signal is the SS.

Furthermore, the receiving end equipment 702 is further configured to obtain the parameters required by the electronic equalization and the electronic depolarization by estimating (calculating) a channel matrix when the control signal indicates that the received time domain signal is the SS. For example, firstly direct channels and cross-talk channels of the frequency domain are estimated, and then the parameters required by the electronic equalization and the electronic depolarization are obtained according to a channel matrix formed by the estimated direct channels and the estimated cross-talk channels of the frequency domain. When the channel matrix is calculated, algorithms such as a least-square algorithm may be adopted for calculation.

The receiving end equipment 702 is further configured to calculate the parameters required by the electronic equalization and the electronic depolarization by adopting an adaptive algorithm based on training when the control signal indicates that the received time domain signal is the SS.

The receiving end equipment 702 is further configured to calculate the parameters required by the electronic equalization and the electronic depolarization through a decision feedback adaptive algorithm when the control signal indicates that the received time domain signal is not the SS.

For details about the calculation for the parameters required by the electronic equalization and the electronic depolarization specifically, reference may be made to Embodiments 2, 3, 4, and 5, and is not repeated here.

The receiving end equipment 702 of the communication system may include a conversion unit 601, a detection unit 602, a parameter calculation unit 603, and a processing unit 604. The conversion unit 601 may include an FFT module (the size of the FFT module is determined according to the number of sub-channels), and the detection unit 602 may include an interception unit 6021, a cross-correlation value calculation unit 6022, and a comparison unit 6023. The parameter calculation unit 603 may include a first parameter calculation unit 6031 and a second parameter calculation unit 6032, or the parameter calculation unit 603 may also include a third parameter calculation unit 6033 and a fourth parameter calculation unit 6034. The processing unit 604 may include several equalization and depolarization devices, or include several independent equalizers and depolarizers (the number of the equalization and depolarization devices, or numbers of the equalizers and the depolarizers are determined according to the number of sub-channels).

To embody that the solution according to the embodiments of the present invention may greatly reduce the realization complexity compared with the prior art, the following simply analyzes and compares the solution of "performing the electronic equalization and the electronic depolarization in a frequency domain" according to the embodiment of the present invention, and the solution of "performing the electronic depolarization in a time domain" in the prior art.

Figure 11:
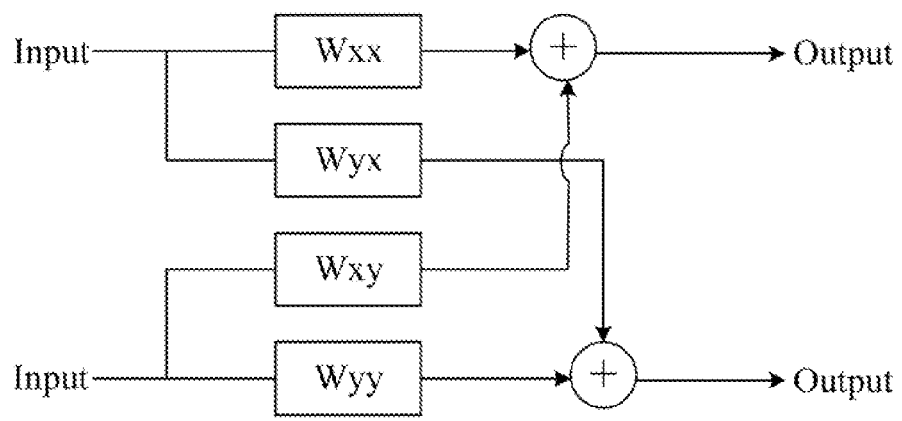
FIG. 11 is a schematic diagram of processing a signal by a depolarizer at the time of performing electronic depolarization in a time domain.
Figure 12:
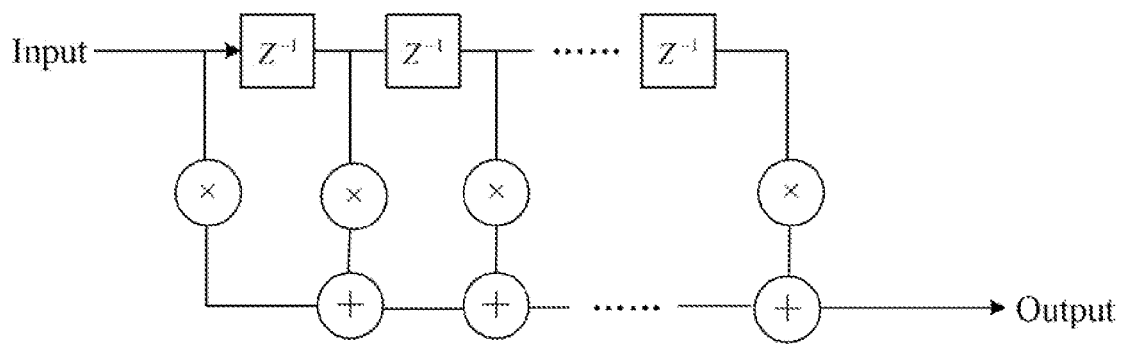
FIG. 12 is a schematic diagram of processing a signal by a finite impulse response (FIR) filter.

For the method for performing the electronic depolarization in the time domain, it is assumed that a sample period is $T_s$. As shown in FIG. 11, a depolarizer includes four FIR filters, that is, Wxx, Wxy, Wyx, and Wyy. FIG. 12 shows a schematic diagram of processing a signal by an FIR filter. Assuming that a tap coefficient of each filter is M, complex multiplication of each filter is performed for M times, and complex addition is performed for M−1 times, so it may be deduced that, the complex multiplication of four filters is totally performed for 4M times, and the complex addition is totally performed for 4×(M−1) times. As shown in FIG. 11, two adders further exist at an output end, so in each sample period, that is, in each $T_s$, computation of the complex multiplication to be performed is 4M, and computation of the complex addition is 4×(M−1)+2=4M−2.

For the method for performing the electronic equalization and the electronic depolarization in the frequency domain, assuming that the number of the sub-channels is N (that is, FFT size=N), if CP is not considered, the OFDM symbol period is N·$T_s$. In each symbol period, that is, in each N·$T_s$, multiplication computation to be performed is 4N, and addition computation is 2N, as shown in FIG. 4 and FIG. 7.

Normalization is performed for comparison. In the time domain method, the required multiplication computation in each second is $$\frac{4M}{T_s},$$

and the addition computation is $$\frac{4M-2}{T_s};$$

in the frequency domain method, the required multiplication computation in each second is $$\frac{4N}{NT_s} = \frac{4}{T_s},$$

and the addition computation is $$\frac{2N}{NT_s} = \frac{2}{T_s}.$$

It can be known that, the complexity of the method for performing the electronic equalization and the electronic depolarization in the frequency domain is much lower than that of the method for performing the electronic equalization and the electronic depolarization in the time domain.

It can be known from the foregoing description that, according to the embodiment of the present invention, the parameters required by the electronic equalization and the electronic depolarization are calculated with the algorithms such as the least-square algorithm or the adaptive algorithm based on training by detecting an SS in a received signal, and then the electronic equalization and the electronic depolarization are performed on the received signal in the frequency domain by utilizing the parameters, so as to solve a problem of the electronic equalization and the electronic depolarization in a PDM OFDM system. Furthermore, it can be known from the foregoing analysis that, the realization complexity, including computation complexity and hardware realization complexity, of the electronic equalization and the electronic depolarization performed in the frequency domain is greatly reduced relative to the electronic equalization and the electronic depolarization performed in the time domain, which also indicates that the time for processing a signal may be greatly reduced, and the cost for constructing a network architecture may also be reduced.

Those of ordinary skill in the art may understand that all or part of the steps of the method according to the embodiments of the present invention may be implemented by a program instructing relevant hardware. The program may be stored in a computer readable storage medium. The storage medium may include: a Read-Only Memory (ROM) or a Random Access Memory (RAM), a magnetic disk or an optical disk.

An electronic equalization and electronic depolarization method, a receiving end equipment, and a communication system provided by the embodiments of the present invention are introduced in detail in the foregoing, and specific examples are applied here to set forth the principle and the implementation of the present invention, and the foregoing illustration of the embodiments is only to help in understanding the method and the core idea of the present invention. Meanwhile, those of ordinarily skill in the art may make variations and modifications to the present invention in terms of the specific implementations and application scopes according to the ideas of the present invention. Therefore, the specification shall not be construed as limitations to the present invention.

What is claimed is:

1. An electronic equalization and electronic depolarization method, comprising:
   converting a received time domain signal into a frequency domain signal;
   detecting a Synchronization Sequence (SS) in the received time domain signal, and obtaining a corresponding control signal, comprising:
      intercepting the received time domain signal through a moving window;
      evaluating a cross-correlation between the intercepted time domain signal and the SS, and obtaining a cross-correlation value; and
      comparing the cross-correlation value with a preset threshold, outputting a control signal indicating that the received time domain signal is the SS if the cross-correlation value is greater than the preset threshold, and outputting a control signal indicating that the received time domain signal is not the SS if the cross-correlation value is smaller than the preset threshold;
   calculating parameters required by electronic equalization and electronic depolarization by a least-square algorithm when the control signal indicates that the received time domain signal is the SS; and performing the electronic equalization and the electronic depolarization on the frequency domain signal by utilizing the parameters.

2. The method according to claim 1, further comprising:
calculating the parameters required by the electronic equalization and the electronic depolarization through a decision feedback adaptive algorithm when the control signal indicates that the received time domain signal is not the SS.

3. The method according to claim 1, wherein the calculating the parameters required by the electronic equalization and the electronic depolarization according to the control signal comprises:
calculating the parameters required by the electronic equalization and the electronic depolarization through a decision feedback adaptive algorithm when the control signal indicates that the received time domain signal is not the SS.

4. The method according to claim 1, wherein the performing the electronic equalization and the electronic depolarization on the frequency domain signal by utilizing the parameters comprises:
performing the electronic equalization and the electronic depolarization respectively on the frequency domain signal by utilizing the parameters; or
performing the electronic equalization and the electronic depolarization on the frequency domain signal simultaneously by utilizing the parameters.

5. A receiving end equipment, comprising:
a conversion unit, configured to convert a received time domain signal into a frequency domain signal;
a detection unit, configured to detect a Synchronization Sequence (SS) in the received time domain signal, and obtain a corresponding control signal, the detection unit comprising:
an interception sub-unit, configured to intercept the received time domain signal through a moving window;
a cross-correlation value calculation sub-unit, configured to evaluate a cross-correlation between the time domain signal intercepted by the interception sub-unit and the SS, and obtain a cross-correlation value; and
a comparison sub-unit, configured to compare the cross-correlation value obtained by the cross-correlation value calculation sub-unit with a preset threshold, output a control signal indicating that the received time domain signal is the SS if the cross-correlation value is greater than the preset threshold, and output a control signal indicating that the received time domain signal is not the SS if the cross-correlation value is smaller than the preset threshold;
a parameter calculation unit, configured to calculate parameters required by electronic equalization and electronic depolarization according to the control signal obtained by the detection unit, the parameter calculation unit comprising:
a first parameter calculation sub-unit, configured to calculate the parameters required by the electronic equalization and the electronic depolarization by a least-square algorithm when the control signal obtained by the detection unit indicates that the received time domain signal is the SS; and a processing unit, configured to perform the electronic equalization and the electronic depolarization on the frequency domain signal converted by the conversion unit by utilizing the parameters calculated by the parameter calculation unit.

6. The receiving end equipment according to claim 5, wherein the parameter calculation unit comprises:
a second parameter calculation sub-unit, configured to calculate the parameters required by the electronic equalization and the electronic depolarization through a decision feedback adaptive algorithm when the control signal obtained by the detection unit indicates that the received time domain signal is not the SS.

7. The receiving end equipment according to claim 5, wherein the processing unit comprises:
an equalizer, configured to perform the electronic equalization on the frequency domain signal converted by the conversion unit by utilizing the parameters calculated by the parameter calculation unit; and
a depolarizer, configured to perform the electronic depolarization on the frequency domain signal converted by the conversion unit by utilizing the parameters calculated by the parameter calculation unit.

8. A communication system, comprising:
a sending end equipment; and
a receiving end equipment,
wherein the sending end equipment is configured to send a time domain signal to the receiving end equipment;
wherein the receiving end equipment is configured to receive the time domain signal sent by the sending end equipment, convert the received time domain signal into a frequency domain signal, detect a Synchronization Sequence (SS) in the received time domain signal, obtain a corresponding control signal, calculate parameters required by electronic equalization and electronic depolarization according to the control signal, and perform the electronic equalization and the electronic depolarization on the converted frequency domain signal by utilizing the parameters;
wherein the detecting the SS in the received time domain signal, obtaining the corresponding control signal comprises:
intercepting the received time domain signal through a moving window;
evaluating a cross-correlation between the intercepted time domain signal and the SS, and obtaining a cross-correlation value; and
comparing the cross-correlation value with a preset threshold, outputting a control signal indicating that the received time domain signal is the SS if the cross-correlation value is greater than the preset threshold, and outputting a control signal indicating that the received time domain signal is not the SS if the cross-correlation value is smaller than the preset threshold; and
wherein the calculating the parameters required by the electronic equalization and the electronic depolarization according to the control signal comprises:
calculating the parameters required by the electronic equalization and the electronic depolarization by a least-square algorithm when the control signal indicates that the received time domain signal is the SS.

* * * * *